United States Patent [19]
Bick et al.

[11] 3,879,269

[45] Apr. 22, 1975

[54] METHODS FOR HIGH CURRENT DENSITY GOLD ELECTROPLATING

[75] Inventors: Maurice Bick, South Orange; Jean A. Lochet, Metuchen, both of N.J.

[73] Assignee: Auric Corporation, Newark, N.J.

[22] Filed: Nov. 23, 1973

[21] Appl. No.: 418,228

Related U.S. Application Data

[63] Continuation-in-part of Ser. No. 354,697, April 26, 1973, Pat. No. 3,833,488.

[52] U.S. Cl. .......... 204/46 G; 204/43 G
[51] Int. Cl. .......... C23b 5/28
[58] Field of Search .......... 204/43 G, 46 G, 44

[56] References Cited

UNITED STATES PATENTS

| | | | |
|---|---|---|---|
| 3,423,295 | 1/1969 | Greenspan | 204/43 G |
| 3,427,231 | 2/1969 | Schneider et al. | 204/46 X |
| 3,770,596 | 11/1973 | Bick et al. | 204/43 G |
| 3,776,821 | 12/1973 | Baker | 204/43 G |
| 3,783,111 | 1/1974 | Bick et al. | 204/46 G |
| 3,791,941 | 2/1974 | Bick et al. | 204/46 G |

OTHER PUBLICATIONS

Frederick A. Lowenheim, "Modern Electroplating," pp. 19 & 20, (1968).

H. Y. Cheh, Electrochem. electrochem. Soc., Vol. 118, No. 4, pp. 551–557, (1971).

*Primary Examiner*—G. L. Kaplan
*Attorney, Agent, or Firm*—Stefan J. Klauber

[57] ABSTRACT

High speed electroplating of electronic components or the like with high purity gold deposits, is enabled by electroplating at current densities of at least 30 A.S.F., utilizing a bath comprising an aqueous solution of a gold-alkali metal cyanide, conducting and buffering compounds, and as a brightener and efficiency-augmenting agent, trivalent arsenic ion. The disclosed baths maintain their relatively high efficiencies for extended periods, even under the intense use conditions indicated.

6 Claims, No Drawings

METHODS FOR HIGH CURRENT DENSITY GOLD ELECTROPLATING

BACKGROUND OF INVENTION

This application is a continuation-in-part of our copending application, Ser. No. 354,697, filed Apr. 26, 1973, for GOLD ELECTROPLATING BATHS, now U.S. Pat. No. 3,833,488, which patent is assigned to the same assignee as the instant application.

This invention relates generally to electroplating baths and methodology, and more specifically relates to the electroplating with gold of electronic components, or the like.

Gold, within recent years, has become a very important part of the electronics industry. Among those properties recommending its use therein, are its relative inalterability, high solderability, and low contact resistance. In the semi-conductor field, gold has furthermore found favor because of its ability to readily form an eutectic alloy with silicon and germanium. In the latter connection, it may be noted that most headers or packages for diodes, transistors, and integrated circuits, are gold plated as a preparation for the mounting or attaching of semi-conductor devices. Such components are exemplified by the well-known line of TO-5 and TO-8 multi-lead headers. Such headers consist of an eyelet of Kovar metal to which several insulated Kovar leads are attached, and sealed in glass.

In the past, headers of the foregoing type have been largely plated through use of so-called barrel plating techniques, or by the more conventional rack plating methodology. Within recent years, however, particularly because of the soaring price of gold, it has been increasingly appreciated that both barrel and rack plating techniques, are exceedingly wasteful of the precious gold. During plating of the cited headers, for example, it will be appreciated that basically one is only interested in providing a plating at the die-receiving faces of the headers, and at the contact connections with header leads, which are present at the said faces. The cited techniques, however, are such that the entire header is plated with gold, including all electrically conductive, accessible portions thereof.

Furthermore, since barrel plating is based upon the development of multiple electrical contacts among the tumbling components, it is basically a statistical process. This is to say, that different components in a tumbled load, may be subjected to markedly different plating times. In order to achieve a desired mean plating thickness, it is therefore necessary to grossly overplate the batch of components being plated during a given cycle. In other words, in order to assure that all of the individual components in a bath receive adequate plating, it is frequently necessary to overplate many of the components by as much as 10–20 percent. This is obviously a further waste of the precious gold material.

In consequence of the foregoing factors, increasing interest has developed in the use of selective plating apparatus and methodology, according to which the components to be plated with gold are in one manner or another plated only at specifically designated portions. Various apparatus is known for such purposes. For example, apparatus useful in selective electroplating of strip substrates is set forth in U.S. Pat. Nos. 3,745,105 and 3,746,630 to Leo N. Kosowsky et al. which patents are assigned to the same assignee as the present application. Of perhaps greater pertinence for present purposes, is apparatus disclosed in the copending application of Frank J. Johnson, Ser. No. 379,113, filed July 13, 1973, which application is also assigned to the assignee of the present application. The Johnson apparatus utilizes a movable carrier belt for the plating solution, and is adapted for selective plating of discrete components, such as the aforementioned headers. Apparatus intended for analogous applications is produced by Owens Ltd. in Great Britain, under such model designations as "Owens Carousel."

The important characteristic of the various apparatus above referenced, is that they all utilize relatively limited duration contact while plating an area on the conductor being treated. They must necessarily, therefore, perform their plating function with great rapidity. From an operational viewpoint this requires high current density plating capabilities. Thus the current densities which are of interest for present purposes, can reside in the general range of from at least 30 to as high as 2000 ampere/sq. ft. (A.S.F.). These current densities are, of course, far in excess of the densities used in simple rack plating operations or the like, or in conventional barrel plating.

When conventional pure gold plating solutions based upon gold citrate systems or the like, are used in the aforementioned high speed plating environments, the efficiency of the gold plating solution has a tendency to drop during prolonged use — a finding which will be further developed in connection with Example I, below. This, of course, is quite aside from the fact that the efficiencies of such conventional solutions may be rather low to begin with. It is believed that the absorption of oxygen by the plating solution may be responsible for such efficiency drop, a hypothesis which is explored in Winters U.S. Pat. No. 3,669,852, to which reference may usefully be had.

In accordance with the foregoing, it may be regarded as an object of the present invention, to provide methodology and baths which enable high current density electroplating of high purity gold, and wherein the baths so utilized retain relatively constant, relatively high levels of efficiency, over extended periods.

SUMMARY OF INVENTION

Now in accordance with the present invention, it has been discovered that the foregoing objects, and others as will become apparent in the course of the ensuing specification, are achieved by utilizing during the aforementioned high current density electroplating operations, a bath which includes: an alkali metal gold cyanide; conducting and buffering compounds including one or more partially neutralized acids in concentrations yielding a bath specific gravity of from about 6° to 22° Baume; and as a brightener and efficiency augmenting agent, from about 2 to 12 mg/l of trivalent arsenic ion. When the aforementioned bath is utilized in plating environments providing current densities of 30 A.S.F. or higher, it is found that the initial 80–85 percent or higher efficiencies, drop to approximate values of 50–60 percent, whereat the efficiencies stabilize. In particular, the still relatively high efficiencies, contrary to expectation, are then consistently maintained over extended periods of bath use. The resultant platings, further, are of uniformly high quality throughout the life of the bath.

The baths of the invention are effective, in use, at temperatures as low as 60°C, and more generally in the range of 60° to 70° C. A preferred specific gravity for the baths is from about 8° to 16° Baume. In preparing the baths of the invention, one adds the conducting and buffering compounds, in quantities which yield a bath specific gravity appropriate to the bath application, and for the acids which are present. Thereafter the pH of the baths, as required, may be adjusted by addition of small quantities of innocuous acids or bases — as is known in the art. The conducting and buffering compounds may include citric acid and its bath soluble salts; and the bath soluble salts of orthophosphoric acid. Of the latter, the primary and/or secondary salts are specifically added to the bath, but depending upon the final pH various fractions of the soluble salts are present at equilibrium — as is known to those familiar with this art.

The deposits of gold achieved in accordance with the invention are found to be substantially pure gold, and are found to be readily acceptable to formation of a gold-silicon eutectic. The deposits are thus eminently suited for application to the semi-conductor and electronic industries. Furthermore, the deposits are markedly smooth, free of nodules, and display excellent distribution, even at relatively high thicknesses. Distribution, in particular, is a most significant factor in reducing the cost of gold plating, a factor of ever-increasing interest in a rising price gold market.

DESCRIPTION OF PREFERRED EMBODIMENT

In order to better understand the nature of the invention, there is set forth in Example I below, a typical prior art bath, of the type which has in the past been utilized for high current density plating of electronic components with high purity gold:

Example I

| | |
|---|---|
| Dipotassium phosphate | 60 g/l |
| Potassium citrate | 65 g/l |
| Citric acid | 45 g/l |
| Gold (as an A.G.C.) about | 32 g/l (as metal) |
| pH adjusted to | 6.0, with KOH or citric acid |

It has been found that when a conventional gold plating solution of the type set forth in Example I, is thus used in a high speed plating machine, the efficiency of the gold plating solution has a tendency to drop over prolonged use. Thus, when the bath in Example I is freshly made up, its efficiency typically varies between about 90 to 98 percent. When such a solution is used in a high speed selective plating machine, such as the Owens Carousel, previously referred to, it is found that it takes about 30 seconds to plate thickness of 50 microinches of gold on a typical M.O.S. package, when solution is fresh. Typically, after a period of one day's use (about 16 hours operation on a double-shift basis), the plating time for effecting the 50 microinch deposit, has increased to 4 minutes; thereafter plating time keeps increasing to a point where the gold solution has to be removed, because the plating time simply becomes too long to be acceptable.

It is obvious that the drop of efficiency implies a lowering in output of the machine in which the bath is used. Thus it is evident that with the reduced plating time of 4 minutes, e.g. only one part may be plated, whereas with the initial plating time of 30 seconds, eight parts could be plated during the same 4 minute period. Furthermore, the frequent change of the plating solutions produces an additional financial burden on the user, because of the requirement for the larger gold inventory, plus refining charges, down-time, etc.

In our aforementioned copending application, Ser. No. 354,697, of which the present application is a continuation-in-part, we have disclosed gold electroplating baths particularly useful in barrel plating operations or the like. The principal thrust of that disclosure relates to the extremely efficient baths which are achieved where quantities of aminoguanidine are incorporated into an aqueous solution including a gold-alkali metal cyanide, suitable conducting and buffering compounds, and brightener and efficiency-augmenting agents — including trivalent arsenic. In the course of developing the significance of the baths therein disclosed, an Example I is set forth describing a relatively low gold-content bath, including monopotassium phosphate, potassium citrate, citric acid and trivalent arsenic ion. That bath as thus described yields good plating results during barrel plating, although not providing efficiencies approaching the 100 percent efficiencies achieved in accordance with other aspects of the cited disclosure.

Baths of the general type disclosed as Example I of the Ser. No. 354,697 application, however, have now been unexpectedly found to have great utility and outstanding results when employed in a high current density electroplating environment. In particular, there is now set forth as Example II hereinbelow, a typical bath utilized in accordance with the present invention:

Example II

| | |
|---|---|
| Monopotassium phosphate | 60 g/l |
| Potassium citrate | 150 g/l |
| Citric acid(or KOH)to yield pH of | 6.0 to 6.5 |
| $As^{+++}$ | 2 mg/l (as metal) |
| Gold (as A.G.C.) | 24 to 40 g/l (as metal) |

The bath of Example II is seen to be of the same general type as is disclosed in the aforementioned parent application, except for the presence of a considerably higher gold concentration. Typically, such gold concentration is of the order of at least 2 troy ounces/gallon, preferably in the range of from 3 to 5 troy ounces/gallon in order to enable use of the baths in the high density plating environments. One troy ounce corresponds to about 8.2 g/l of the gold metal. The important point experimentally observed, is that the bath of Example II, when used to provide current densities of 30 A.S.F. or higher, exhibits an initial drop in efficiency, and thereafter maintains an estimated efficiency of the order of 50 to 60 percent, over a very extended period of use.

Superior results are achieved in baths of the general type as set forth in Example II, when between about 30 to 70 g/l of boric acid are present in the said baths; a particularly satisfactory level of addition occurs at about 60 g/l. A bath of this type is set forth below, as Example III.

Example III

| | |
|---|---|
| Monopotassium phosphate | 40 g/l |
| Potassium citrate | 130 g/l |
| Boric Acid | 60 g/l |
| $As^{+++}$ | 4 mg/l |
| Gold | 32 g/l |
| Citric Acid (or KOH), to yield a pH of about 6.0 | |

When the bath of Example III is used in apparatus of the Owens Carousel type, a typical plating cycle for plating 50 microinches of pure gold on an MOS package, starts at about 24 seconds and slowly increases, in about one week, to about 45 seconds. Thereafter no further decrease in the efficiency is observed, and the bath has to be discarded only when the level of metallic contaminants, such as iron, render the bath unsuitable for semi-conductor applications. Average current densities during these operations is about 40 A.S.F. It may, incidentally, be noted for purposes of comparison, that conventional still plating (e.g. in racks) would require about 10 to 15 minutes exposure to achieve the 50 microinch deposits yielded in the present high current density environment.

It is not completely understood why the baths of Examples II and III should yield superior performance during high current density applications, in comparison to the bath of Example I. Nor is it completely clear why the bath of Example III performs in superior fashion — in comparison to the bath of Example II. As is frequently deemed to be the case in gold electroplating environments, it is speculated that a synergistic effect of some type may occur among the components — to yield the unexpected findings.

The pH of the aforementioned baths is not sharply critical, and can be held in a range of about 5 to 8 — although preferably between about 5.5 to 6.5 when plating is done over Kovar or a nickel-iron alloy. The pH can be adjusted between 7 and 8 to plate over copper, although the most consistent results appear to be achieved in the cited range of 5.5 to 6.5.

The concentration of arsenic ion is relatively critical, and should be held in a preferred range of from about 2 to 4 mg/l. Concentrations of as high as 10 to 12 mg/l are acceptable; but above this figure codeposition of arsenic may occur.

Analysis of deposits yielded from the bath of Example III do not show any trace of arsenic in the deposit. This, of course, is a major consideration, in that in order to readily form a silicon-gold eutectic, the gold deposit must be very pure in character, and free from metallic impurities that are capable of interfering with the formation of the said eutectic. Such impurities are also, of course, known to dope the ohmic contacts, and thereby adversely affect resulting semi-conductor devices.

Arsenic may be added to the bath in the form of potassium or sodium arsenite, or of other bath soluble salts. In general, the level of addition of this brightener and efficiency-augmenting agent, will be in concentrations sufficient to provide an increase in efficiency of the bath and improvement in the surface qualities for the resultant plating — in comparison to the corresponding characteristics obtained in the absence thereof.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for high current density gold electroplating of conductors comprising:

electroplating said conductor in an aqueous bath comprising an alkali metal gold cyanide, said gold being present from about 24 to 40 g/l calculated as the metal; as a brightener and efficiency-augmenting agent, from about 2 to 12 mg/l of trivalent arsenic ion; additional conducting and buffering compounds including one or more partially neutralized acids, said compounds being present in concentrations appropriate in the presence of the remaining bath components to adjust the bath specific gravity to a desired level of from about 6° to 22° Baume, said level being above that which would be achieved in the absence of said compounds; and the said electroplating of said conductor being conducted while maintaining a mean current density of at least 30 A.S.F., and for cumulative periods sufficient to cause the initially displayed efficiency of said bath to decline to approximate levels of 50 to 60 percent, whereat said efficiency stabilizes.

2. A method in accordance with claim 1, wherein said conducting and buffering compounds include citric acid and bath soluble salts of said acid.

3. A method in accordance with claim 2, further including between about 30 to 70 g/l of boric acid.

4. A method in accordance with claim 1, wherein said arsenic is present in concentrations of from about 2 to 4 mg/l.

5. A method in accordance with claim 1, wherein said bath pH is maintained between about 5 to 8.

6. A method in accordance with claim 1, wherein said conducting and buffering compounds include one or more compounds selected from the group consisting of the bath soluble alkali metal salts of orthophosphoric acid.

* * * * *